United States Patent
Imada et al.

(10) Patent No.: US 8,175,431 B2
(45) Date of Patent: May 8, 2012

(54) MULTI-CORE FERRULE AND OPTICAL FIBER CONNECTION STRUCTURE

(75) Inventors: Yuuki Imada, Kanagawa (JP); Shinichi Shimotu, Kanagawa (JP)

(73) Assignee: Fujifilm Corporation (JP)

( * ) Notice: Subject to any disclaimer, the term of this patent is extended or adjusted under 35 U.S.C. 154(b) by 398 days.

(21) Appl. No.: 12/491,007

(22) Filed: Jun. 24, 2009

(65) Prior Publication Data

US 2010/0158444 A1    Jun. 24, 2010

(30) Foreign Application Priority Data

Jun. 25, 2008 (JP) ................. 2008-165917

(51) Int. Cl.
    G02B 6/32    (2006.01)
(52) U.S. Cl. ................ 385/39; 385/71; 385/72
(58) Field of Classification Search ............ 385/39, 385/70–73
    See application file for complete search history.

(56) References Cited

U.S. PATENT DOCUMENTS

| | | | |
|---|---|---|---|
| 7,218,811 B2 * | 5/2007 | Shigenaga et al. | 385/33 |
| 2002/0031300 A1 * | 3/2002 | Jie et al. | 385/33 |
| 2005/0008301 A1 * | 1/2005 | Fuse et al. | 385/78 |
| 2005/0249465 A1 * | 11/2005 | Kevern et al. | 385/56 |
| 2008/0193087 A1 * | 8/2008 | Ishida et al. | 385/84 |

FOREIGN PATENT DOCUMENTS

| | | |
|---|---|---|
| JP | 55-033130 A | 3/1980 |
| JP | 03-044603 | 2/1991 |
| JP | 10-260336 | 9/1998 |
| JP | 2000-180664 A | 6/2000 |
| JP | 2002-333528 A | 11/2002 |
| JP | 2004-219567 A | 8/2004 |

* cited by examiner

*Primary Examiner* — Eric Wong
(74) *Attorney, Agent, or Firm* — Studebaker & Brackett PC; Donald R. Studebaker

(57) ABSTRACT

An optical fiber connection structure includes a single-core plug holding a single-core ferrule, a multi-core plug holding a multi-core ferrule, and an adaptor having a tubular sleeve. The single-core ferrule made of zirconia ($ZrO_2$) has a cylindrical shape and is held in a holder made of stainless steel (SUS). The single-core ferrule has a convex end surface whose curvature radius R1 is at least 50 mm. The multi-core ferrule made of zirconia ($ZrO_2$) has a cylindrical shape and is held in a holder made of stainless steel (SUS). The multi-core ferrule has a convex end surface whose curvature radius R2 is at least 18.3 mm and at most 38.7 mm. When the first and second plugs are attached to the adaptor, the singe-core ferrule and the multi-core ferrule are respectively inserted from the opposite ends into the sleeve, and both of the end surfaces of the ferrules are pressed against each other.

10 Claims, 7 Drawing Sheets

MULTI-CORE FERRULE AND OPTICAL FIBER CONNECTION STRUCTURE

BACKGROUND OF THE INVENTION

1. Field of the Invention

The present invention relates to a connection structure for connecting an optical fiber bundle to a single optical fiber, and also to a multi-core ferrule for holding the optical fiber bundle.

2. Description Related to the Prior Art

Since optical fibers are capable of transmitting a large volume of information, they are widely used as optical waveguides in the communication field and the industrial field. The optical fibers are formed of, for example, a core having a diameter of 205 µm and a clad surrounding the core and having an outer diameter of 250 µm. The outside of the clad is usually protected with a coating material.

When the optical fibers are connected, a ferrule is attached to an end of each optical fiber so that their axes are aligned parallel to each other. The ferrule has a cylindrical shape and has a through hole extending in its axial direction. The optical fiber is inserted into this through hole and fixed thereto using an adhesive material such that an end surface of the optical fiber approximately coincides with an end surface of the ferrule.

The ferrule is loaded inside a plug. Two plugs are inserted from opposite ends into an adaptor. The adaptor has a sleeve, and the ferrules are inserted from opposite ends into the sleeve, thereby the end surfaces of the ferrules are pressed against each other. These two optical fibers are aligned inside the sleeve and optically connected.

Optical fiber connection structures are broadly classified into three types: a single/single-core connection structure, a multi/multi-core connection structure, and a multi/single-core connection structure. In the single/single-core connection structure, a single optical fiber is connected to another single optical fiber (see for example, JIS C5973, F04 type single-core optical fiber connector). In the multi/multi-core connection structure, an optical fiber bundle which is formed of a plurality of optical fibers is connected to another optical fiber bundle (see for example, JIS C5982, F13 type multi-core optical fiber connector). In the multi/single-core connection structure, an optical fiber bundle which is formed of a plurality of optical fibers (see for example, Japanese Patent Laid-Open Publication No. 55-033130 and Japanese Patent Laid-Open Publication No. 03-044603) is connected to a single optical fiber.

By the way, if there is a gap between the end surfaces of the optical fibers, Fresnel reflection occurs at the interface between the optical fiber and the air in the gap, which results in optical loss. The Fresnel reflection is generally prevented by a physical contact (PC) connection for physically contacting the optical fibers closely, and thereby minimizing the optical loss.

In the single/single-core connection structure, as shown in page 6 and FIG. 5 of Japanese Patent Laid-Open Publication No. 10-260336 for example, a ferrule holding an optical fiber is finished to have a convex spherical end surface with a curvature radius of 15 mm to 25 mm, and two ferrules, each holding the optical fiber, are pressed against each other, thereby elastically deforming their end surfaces. Owing to this, there is no gap formed between the end surfaces, thus ensuring the PC connection. In Japanese Patent Laid-Open Publication No. 2002-333528, optical fibers are protruded from end surfaces of ferrules, and thereby ensuring the PC connection. Japanese Patent Laid-Open Publication No. 2000-180664 discloses the single/single-core connection structure which does not hire the PC connection. In this publication, ferrules are finished to have flat end surfaces, and the flat end surfaces are faced against each other. In addition, Japanese Patent Laid-Open Publication No. 2004-219567 discloses conditions (conditional equations for a curvature radius of an end surface of a ferrule, for the number of optical fibers in a bundle, etc.) for assuring the PC connection in the multi/multi-core connection structure.

In the multi/single-core connection structure, the PC connection is assured by finishing an end surface of each ferrule into a convex spherical surface (hereinafter referred to as convex surface), and pressing the ferrules, each holding a single optical fiber or an optical fiber bundle, against each other to elastically deform their end surfaces in the same manner as the single/single-core connection structure. According to the single/single-core connection structure disclosed in the Japanese Patent Laid-Open Publication No. 2002-333528, however, it is difficult to uniformly protrude respective optical fibers composing the optical fiber bundle, and therefore the PC connection cannot be assured.

According to the single/single-core connection structure disclosed in the Japanese Patent Laid-Open Publication No. 2000-180664, the ferrules have flat end surfaces and the sleeve needs to be formed with high precision, which results in a rise in production cost for assuring the connection.

Note that the conditional equations disclosed in the Japanese Patent Laid-Open Publication No. 2004-219567 are applied only for connecting the single optical fiber to another single optical fiber of the optical fiber bundles, and therefore not applicable in the multi/single-core connection structure.

SUMMARY OF THE INVENTION

An object of the present invention is to provide a multi-core ferrule and an optical fiber connection structure minimizing optical loss at low cost.

In order to achieve the above and other objects, a multi-core ferrule of the present invention holds an optical fiber bundle and optically connects the optical fiber bundle to a single optical fiber held in a single-core ferrule. The multi-core ferrule has a second end surface which is in abutting contact with a first end surface of the single-core ferrule, and a second through hole that aligns with a first through hole of the single-core ferrule. The second end surface is a convex spherical surface whose curvature radius is in the range of 18.3 mm to 38.7 mm. The second through hole penetrates the center of the second end surface and has a smaller diameter than the first through hole. The optical fiber bundle is inserted into the second through hole such that an end surface of the optical fiber bundle coincides with the second end surface. The first end surface of the single-core ferrule is a convex spherical surface whose curvature radius is at least 50 mm. The circular first through hole penetrates the center of the first end surface. The optical fiber is inserted into the first through hole such that an end surface of the optical fiber coincides with the first end surface.

The first through hole has an inner diameter of 255 µm. The second through hole has an inner diameter of 200 µm. The optical fiber bundle is fixed inside the second through hole using an adhesive material. The optical fiber bundle has four optical fibers.

The optical fiber held in the single-core ferrule includes a core having a diameter of 205 µm and a clad surrounding the core and having an outer diameter of 250 µm. Each of the optical fibers forming the optical fiber bundle includes a core having a diameter of 60 μm and a clad surrounding the core and having an outer diameter of 80 μm.

A connection structure of the present invention has a single-core ferrule for holding an optical fiber and a multi-core ferrule for holding an optical fiber bundle. The single-core ferrule has a convex first end surface whose radius curvature is at least 50 mm and a circular first through hole penetrating the center of the first end surface. The optical fiber is inserted into the first through hole such that an end surface thereof coincides with the first end surface. The multi-core ferrule has a convex second end surface whose radius curvature is in the range of 18.3 mm to 38.7 mm and a circular second through hole penetrating the center of the second end surface. The optical fiber bundle is inserted into the second through hole such that an end surface thereof aligns with the second end surface. The second through hole has a smaller diameter than the first through hole. The second end surface is in abutting contact with the first end surface with the second through hole aligned with the first through hole.

The connection structure has a first holder for holding the single-core ferrule and a second holder for holding the multi-core ferrule. The first and second holders are pressed by first and second press members respectively so that the first end surface is brought into contact with the second end surface. The first plug holds the single-core ferrule, the first holder and the first press member. The second plug holds the multi-core ferrule, the second holder and the second press member. The adaptor joins the first plug and the second plug.

The present invention minimizes optical loss while ensuring the PC connection and is provided at low cost.

BRIEF DESCRIPTION OF THE DRAWINGS

One with ordinary skill in the art would easily understand the above-described objects and advantages of the present invention when the following detailed description is read with reference to the drawings attached hereto.

DESCRIPTION OF THE PREFERRED EMBODIMENTS

Figure 1:
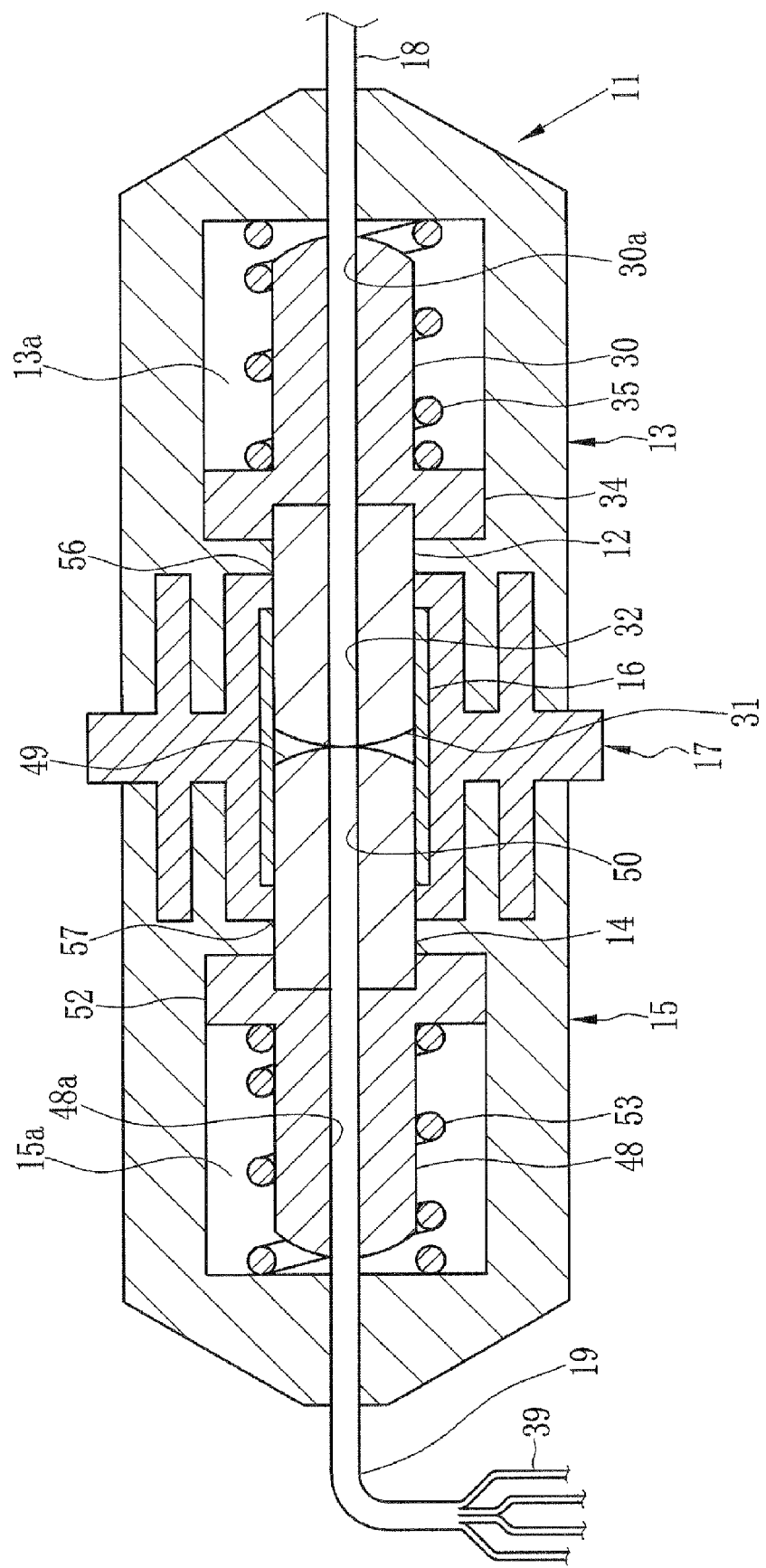
FIG. 1 is a sectional view of an optical fiber connection structure.

In FIG. 1, an optical fiber connection structure (connection device) 11 includes a single-core plug 13 holding a single-core ferrule 12, a multi-core plug 15 holding a multi-core ferrule 14, and an adaptor 17 having a cylindrical sleeve 16. The connection structure 11 optically connects an optical fiber 18 on the single-core plug 13 side and an optical fiber bundle 19 on the multi-core plug 15 side. Light carrying information thereon is transmitted from the optical fiber bundle 19 to the optical fiber 18. Although this embodiment explains the F04 type optical connector (what is called SC type optical connector), the present invention is also applicable to other types of optical connectors.

Figure 2:
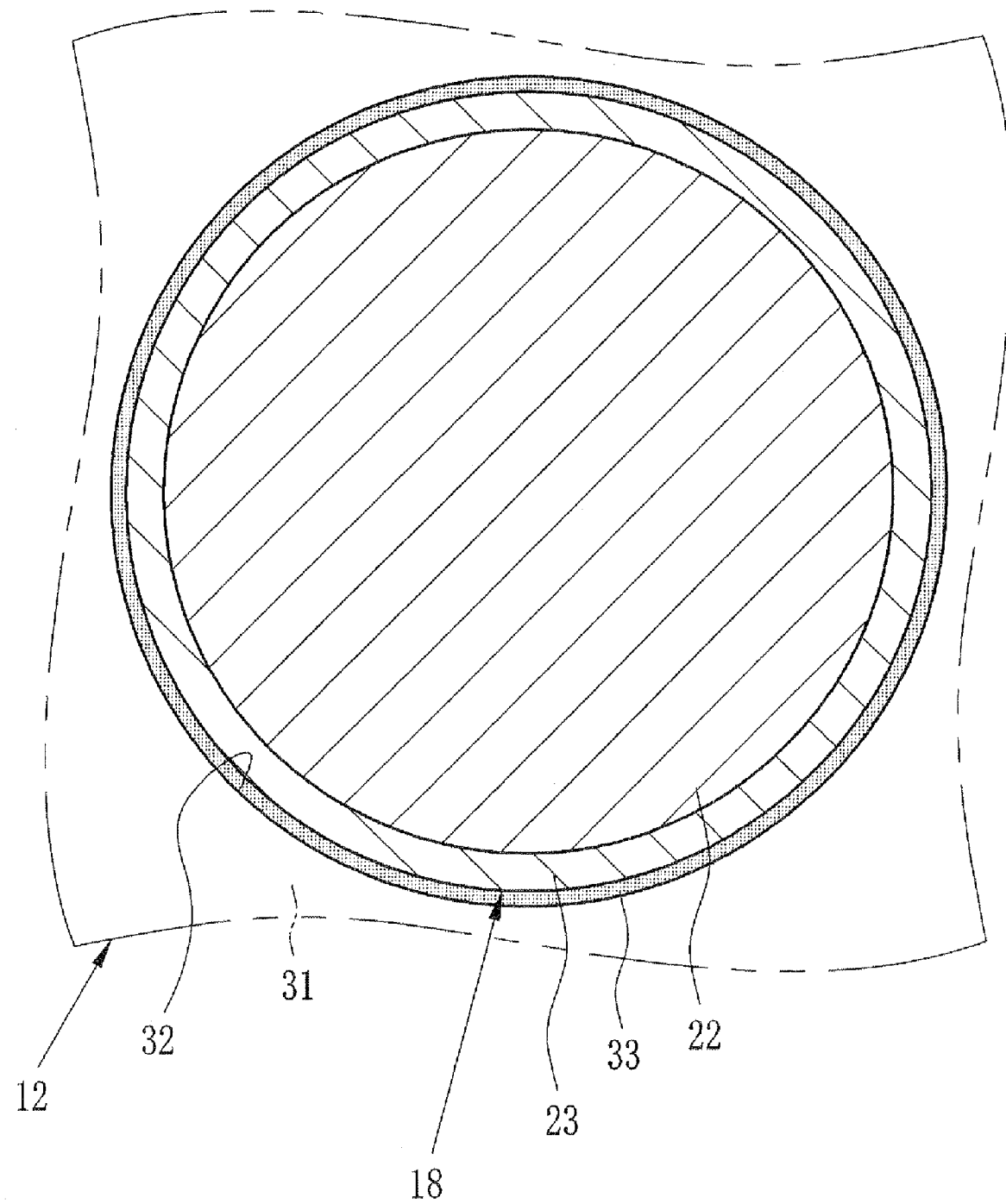
FIG. 2 is a plan view illustrating an end surface of a single-core ferrule into which the optical fiber is inserted.

As shown in FIG. 2, the optical fiber 18 is formed of a core 22 having an outer diameter of 205 μm and a clad 23 surrounding the core 22 and having an outer diameter of 250 μm. The optical fiber 18 is covered with a silicon resin and a nylon resin (both not shown) except the part within the single-core plug 13.

Figure 3:
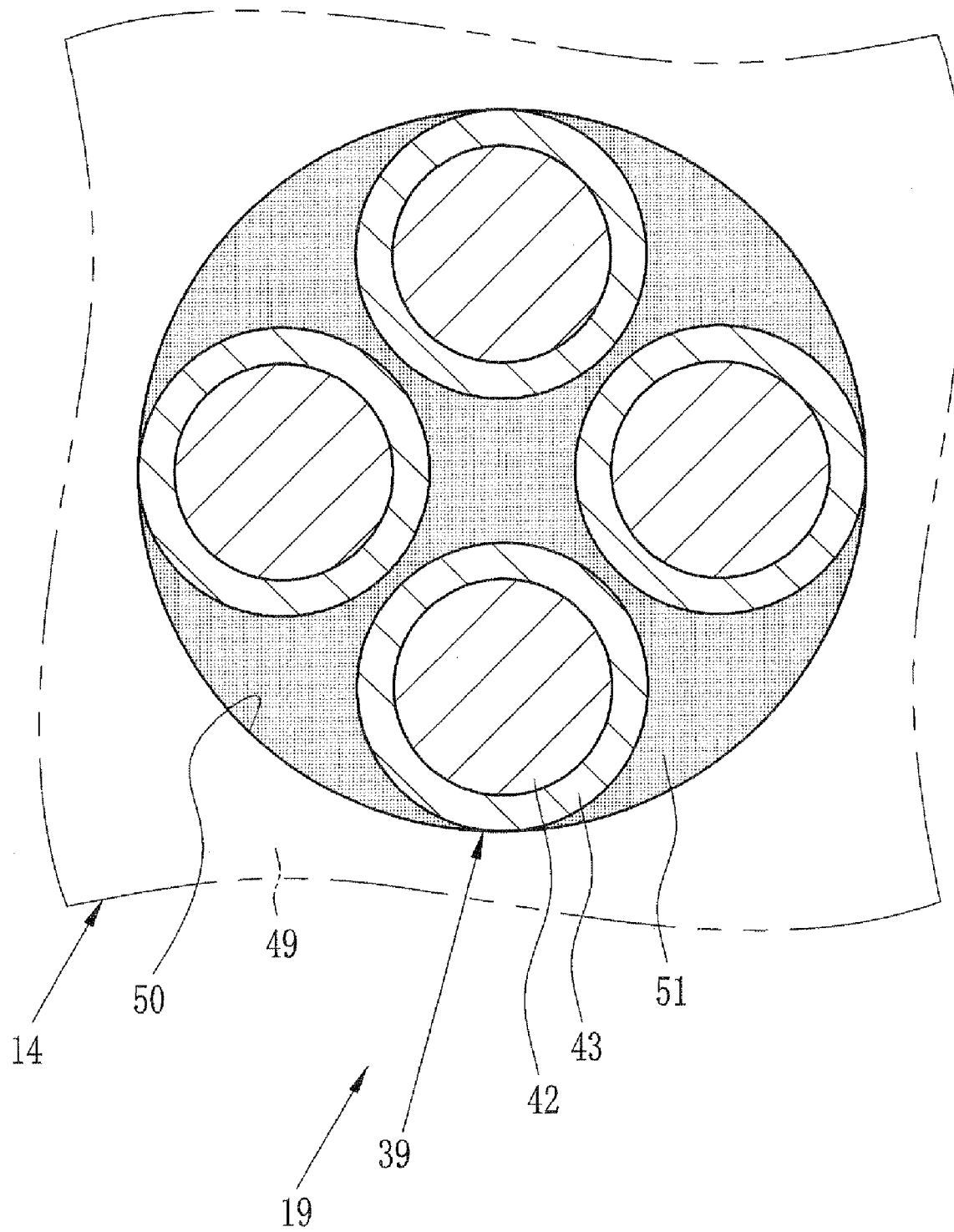
FIG. 3 is a plan view illustrating an end surface of a multi-core ferrule into which an optical fiber bundle is inserted.

As shown in FIG. 3, the optical fiber bundle 19 is formed of a bundle of four optical fibers 39. Each optical fiber 39 is formed of a core 42 having an outer diameter of 60 μm and a clad 43 surrounding the core 42 and having an outer diameter of 80 μm. The optical fiber bundle 19 is covered with a silicon resin and a nylon resin (both not shown) except the part within the multi-core plug 15.

In FIG. 1, the single-core ferrule 12 made of zirconia ($ZrO_2$) has a cylindrical shape and its end surface 31 is shaped into convex curve with a curvature radius R1 of preferably at least 50 mm (R1≧50 mm). A through hole 32 whose inner diameter is 255 μm is formed at the center of the single-core ferrule 12. The optical fiber 18 is inserted into the through hole 32 from an rear end side thereof. A space inside the through hole 32 is filled with an adhesive material 33 (see FIG. 2), and thereby fixing the optical fiber 18 inside the through hole 32. An end surface of the optical fiber 18 is exposed from the through hole 32 and has an approximately equal curvature radius to the end surface 31 of the single-core ferrule 12 so as to follow the shape of the end surface 31.

The end surface 31 of the single-core ferrule 12 with the optical fiber 18 fixed thereto is finished by polishing (grinding). The end surface 31 is firstly polished with a coarse first polishing sheet made of glass. Secondly, the end surface 31 is polished with a second polishing sheet of rubber, smoother as compared to the first polishing sheet, while a polishing liquid is pored. Thirdly, the end surface 31 is polished with a third polishing sheet of rubber, smoother as compared to the second polishing sheet, while pure water is pored. Lastly, the end surface 31 is polished with a finishing sheet of rubber, smoother as compared to the third polishing sheet. The degree of spherical surface is controlled based on the degree of hardness of the sheet. Since the sheet made of glass which has higher degree of hardness compared to the rubber is used in an initial stage of the polishing process, the obtained spherical surface becomes flatter than using the sheet made of rubber. Any of PR5X-500 (rubber), PR5X-508 (rubber) and PGX-490-00 (glass), manufactured by Seikoh Giken Co., Ltd., may be used as the sheets for polishing the single-core ferrule 12. At the time of polishing the end surface 31, the end surface of the optical fiber 18 is polished together into a sphere.

A holder 30 made of stainless steel (SUS) has a cylindrical shape, and the single-core ferrule 12 is fixed at a front end of the holder 30. The optical fiber 18 is inserted into a shaft hole 30a of the holder 30. A flange 34 is formed at the front end of the holder 30, and this flange 34 is slidably fitted into a holder chamber 13a of the singe-core plug 13. Inside of the holder chamber 13a is provided a coil spring 35 that presses a rear surface of the flange 34. Owing to this coil spring 35, the holder 30 and the single-core ferrule 12 can move backward when the single-core plug 13 is inserted to the adaptor 17.

The multi-core ferrule 14 made of zirconia ($ZrO_2$) has a cylindrical shape and its end surface 49 is shaped into convex curve with a curvature radius R2 of preferably at least 18.3 mm and at most 38.7 mm (18.3 mm≦R2≦38.7 mm). A through hole 50 whose inner diameter is 200 μm is formed at the center of the multi-core ferrule 14. The inner diameter of the through hole 50 is smaller than that of the through hole 32 of the single-core ferrule 12. The optical fiber bundle 19 is inserted into the through hole 50 from an rear end side thereof. A space inside the through hole 50 is filled with an adhesive material 51 (see FIG. 3), and thereby fixing the optical fiber bundle 19 inside the through hole 50. An end surface of the optical fiber bundle 19 is exposed from the through hole 50 and has an approximately equal curvature radius to the end surface 49 of the multi-core ferrule 14 so as to follow the shape of the end surface 49.

The end surface 49 of the multi-core ferrule 14 with the optical fiber bundle 19 fixed thereto is finished by polishing (grinding). The method for polishing the multi-core ferrule 14 is same as that for polishing the single-core ferrule 12 except that the first polishing sheet is made of rubber. Since the sheet made of rubber is used in the first polishing process, the obtained spherical surface has larger curvature radius than using the sheet made of glass. Above described PR5X-500 and PR5X-508, manufactured by Seikoh Giken Co., Ltd., may be used as the sheets for finishing the multi-core ferrule 14. At the time of polishing the end surface 49, the end surface of the optical fiber bundle 19 is polished together into a sphere. The optical fibers 39 of the optical fiber bundle 19 come loose a little at the time of polishing, and therefore the end surface of each optical fiber 39 tends to have a projecting central part.

Since the multi-core plug 15, a holder 48 and a coil spring 53 have the same configurations as the single-core plug 13, the holder 30 and the coil spring 35, respectively, detailed descriptions thereof are omitted. Although it is not shown in the drawing, the plugs 13 and 15 are respectively divided around the holder chambers 13a and 15a into two parts: a front half part and a rear half part.

The adaptor 17 is formed with an insertion hole 56 to which the single-core plug 13 is removably inserted and an insertion hole 57 to which the multi-core plug 15 is removably inserted such that the insertion holes 56 and 57 are faced with each other. The sleeve 16 is disposed between the insertion holes 56 and 57. The single-core plug 13 inserted through the insertion hole 56 and the multi-core plug 15 inserted through the insertion hole 57 are pressed against each other in the sleeve 16, and thereby optically connecting the optical fiber 18 and the optical fiber bundle 19.

The other end of the optical fiber bundle 19 branches into four optical fibers 39 and each of them is covered with a silicon resin and a nylon resin (both not shown). A single-core plug holding a single-core ferrule (not shown) is attached to an edge of each optical fiber 39. This single-core plug attached to the optical fiber 39 can be any of the industry standard plug, such as an SC-A type or an SCH-2A type.

To connect the optical fibers, an edge of the optical fiber 18 is inserted into the rear end of the single-core plug 13, and then into the holder 30 and the single-core ferrule 12 which are integrated. The adhesive material 33 is injected from the side of the end surface 31 of the single-core ferrule 12, thereby fixing the optical fiber 18 inside the through hole 32 such that the end surface of the optical fiber 18 coincides with or slightly protrudes from the end surface 31. After the adhesive material 33 is hardened, the end surface 31 is polished into a predetermined sphere. After the polishing, the coil spring 35 is attached to the holder 30 and set in the holder chamber 13a of the single-core plug 13. Finally, the front half part of the single-core plug 13 is fitted to the rear half of the same so that the holder 30 will not fall off. In the same manner, the optical fiber bundle 19 is fixed to the multi-core plug 15.

The plugs 13 and 15 are fitted from the opposite ends into the adaptor 17 and fixed so as not to fall off. Inside of the sleeve 16, the end surface 31 of the single-core ferrule 12 and the end surface 49 of the multi-core ferrule 14 are pressed against each other, and the optical fiber 18 and the optical fiber bundle 19 are aligned, thereby optically connecting the optical fiber 18 and the optical fiber bundle 19. At this time, the end surface 31 of the single-core ferrule 12 and the end surface 49 of the multi-core ferrule 14 do not contact with each other completely since both surfaces are finished into spheres, as specifically shown in FIG. 7. There is a gap $\Delta$ formed between these end surfaces.

EXAMPLE 1

Hereinafter, Example 1 of the present invention is explained with several experiments and comparative experiments.

Experiment 1

After the optical fiber 18 was fixed to the single-core ferrule 12, the end surface 31 of the single-core ferrule 12 was polished, according to the above-described polishing method, into a convex surface with the curvature radius R1 of 120 mm. After the optical fiber bundle 19 was fixed to the multi-core ferrule 14, the end surface 49 of the multi-core ferrule 14 was polished into a convex surface with the curvature radius R2 of 25 mm. The polished single-core ferrule 12 and the multi-core ferrule 14 were placed inside the plugs 13 and 15, respectively. These plugs 13 and 15 were attached to the adaptor 17, and thereby completing the connection structure 11. The assembly method of the connection structure was same as described above in the following experiments and comparative experiments, and therefore only the surface processing of the single-core ferrule 12 and the multi-core ferrule 14 will be explained hereafter.

Experiment 2

The end surface 31 of the single-core ferrule 12 was polished into a convex surface with the curvature radius R1 of 90 mm. The multi-core ferrule 14 was finished under the same condition as experiment 1.

Experiment 3

The end surface 31 of the single-core ferrule 12 was polished into a convex surface with the curvature radius R1 of 65 mm. The multi-core ferrule 14 was finished under the same condition as experiment 1.

Experiment 4

The end surface 31 of the single-core ferrule 12 was polished into a convex surface with the curvature radius R1 of 120 mm. The end surface 49 of the multi-core ferrule 14 was polished into a convex surface with the curvature radius R2 of 38.7 mm.

Experiment 5

The end surface 31 of the single-core ferrule 12 was polished into a convex surface with the curvature radius R1 of 90 mm. The multi-core ferrule 14 was finished under the same condition as experiment 4.

Experiment 6

The end surface 31 of the single-core ferrule 12 was polished into a convex surface with the curvature radius R1 of 65 mm. The multi-core ferrule 14 was finished under the same condition as experiment 4.

Comparative Experiment 1

The end surface 31 of the single-core ferrule 12 was polished into a convex surface with the curvature radius R1 of 25 mm. The end surface 49 of the multi-core ferrule 14 was polished into a convex surface with the curvature radius R2 of 25 mm.

Comparative Experiment 2

The end surface 31 of the single-core ferrule 12 was polished into a convex surface with the curvature radius R1 of 17 mm. The multi-core ferrule 14 was finished under the same condition as comparative experiment 1.

Comparative Experiment 3

The end surface 31 of the single-core ferrule 12 was polished into a convex surface with the curvature radius R1 of 10 mm. The multi-core ferrule 14 was finished under the same condition as comparative experiment 1.

Comparative Experiment 4

The end surface 31 of the single-core ferrule 12 was polished into a convex surface with the curvature radius R1 of 25 mm. The end surface 49 of the multi-core ferrule 14 was polished into a convex surface with the curvature radius R2 of 38.7 mm.

Comparative Experiment 5

The end surface 31 of the single-core ferrule 12 was polished into a convex surface with the curvature radius R1 of 17 mm. The multi-core ferrule 14 was finished under the same condition as comparative experiment 4.

Comparative Experiment 6

The end surface 31 of the single-core ferrule 12 was polished into a convex surface with the curvature radius R1 of 10 mm. The multi-core ferrule 14 was finished under the same condition as comparative experiment 4.

In each of the experiments and the comparative experiments, a test for conducting light having a wave length of 405 nm and an electric power of 1.4 watts to the connection structure 11 of the optical fibers was performed, and light transmission after 100 hours was measured. A semiconductor laser was used as a light source.

Figure 4:
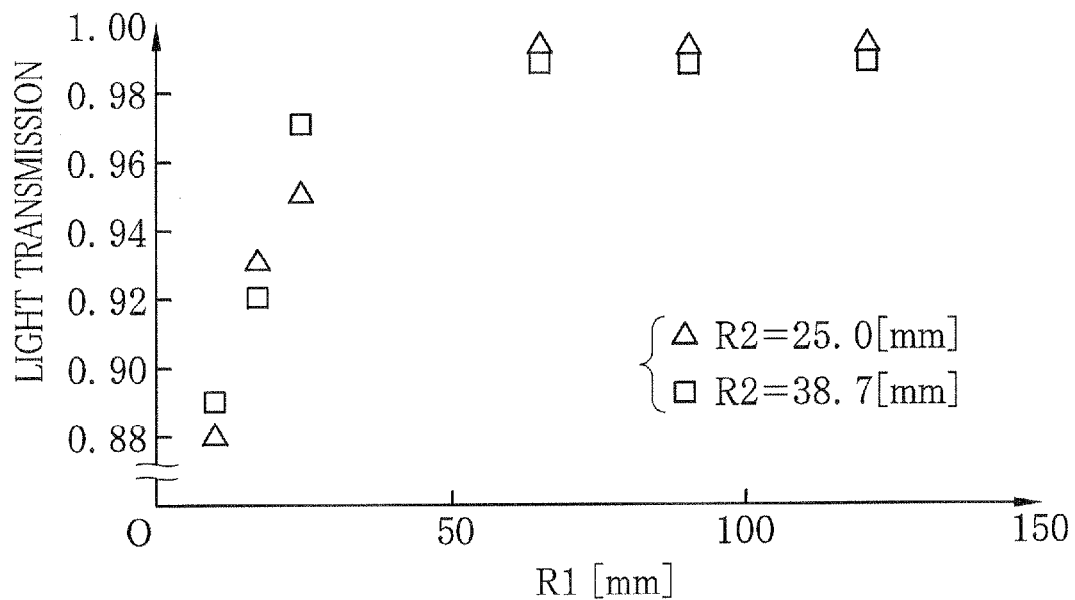
FIG. 4 is a graph showing a relation between a curvature radius R1 of the end surface of the single-core ferrule and light transmission.

As shown in FIG. 4, the light transmissions in the experiments 1 to 6 were 0.99 and they were evaluated as "Very Good". On the contrary, the light transmission in the comparative experiment 1 was 0.95 and it was evaluated as "Very Poor". The light transmission in the comparative experiment 2 was 0.93 and it was evaluated as "Very Poor". The light transmission in the comparative experiment 3 was 0.88 and it was evaluated as "Very Poor". The light transmission in the comparative experiment 4 was 0.97 and it was evaluated as "Poor". The light transmission in the comparative experiment 5 was 0.92 and it was evaluated as "Very Poor". The light transmission in the comparative experiment 6 was 0.89 and it was evaluated as "Very Poor".

According to the results of the experiments and the comparative experiments, it is confirmed that the convex end surface 31 of the single-core ferrule 12 having the curvature radius R1 of at least 50 mm (R1≧50 mm) when the convex end surface 49 of the multi-core ferrule 14 has the curvature radius R2 of 25 mm or 38.7 mm (R2=25 mm or 38.7 mm) provides high light transmission.

EXAMPLE 2

Hereinafter, Example 2 of the present invention is explained.

Experiment 1

Based on the results of Example 1, the end surface 31 of the single-core ferrule 12 was finished into a convex surface with the curvature radius R1 of at least 50 mm (R1≧50 mm). The end surface 49 of the multi-core ferrule 14 was finished into a convex surface with the curvature radius R2 of 38.7 mm (R2=38.7 mm).

Experiment 2

The end surface 31 of the single-core ferrule 12 was finished into a convex surface with the curvature radius R1 of at least 50 mm (R1≧50 mm). The end surface 49 of the multi-core ferrule 14 was finished into a convex surface with the curvature radius R2 of 25 mm (R2=25 mm).

Experiment 3

The end surface 31 of the single-core ferrule 12 was finished into a convex surface with the curvature radius R1 of at least 50 mm (R1≧50 mm). The end surface 49 of the multi-core ferrule 14 was finished into a convex surface with the curvature radius R2 of 18.3 mm (R2=18.3 mm).

Comparative Experiment 1

The end surface 31 of the single-core ferrule 12 was finished into a convex surface with the curvature radius R1 of at least 50 mm (R1≧50 mm). The end surface 49 of the multi-core ferrule 14 was finished into a convex surface with the curvature radius R2 of 44.1 mm (R2=44.1 mm).

Comparative Experiment 2

The end surface 31 of the single-core ferrule 12 was finished into a convex surface with the curvature radius R1 of at least 50 mm (R1≧50 mm). The end surface 49 of the multi-core ferrule 14 was finished into a convex surface with the curvature radius R2 of 14.5 mm (R2=14.5 mm).

In each of the experiments and the comparative experiments, a test for conducting light having a wave length of 405 nm and an electric power of 1.4 watts to the connection structure 11 of the optical fibers was performed, and the time the output to fall by 10% was measured. Note that the end surface 31 of the single-core ferrule 12 specifically had the curvature radius R1 of 70 mm, 90 mm or the like.

Figure 5:
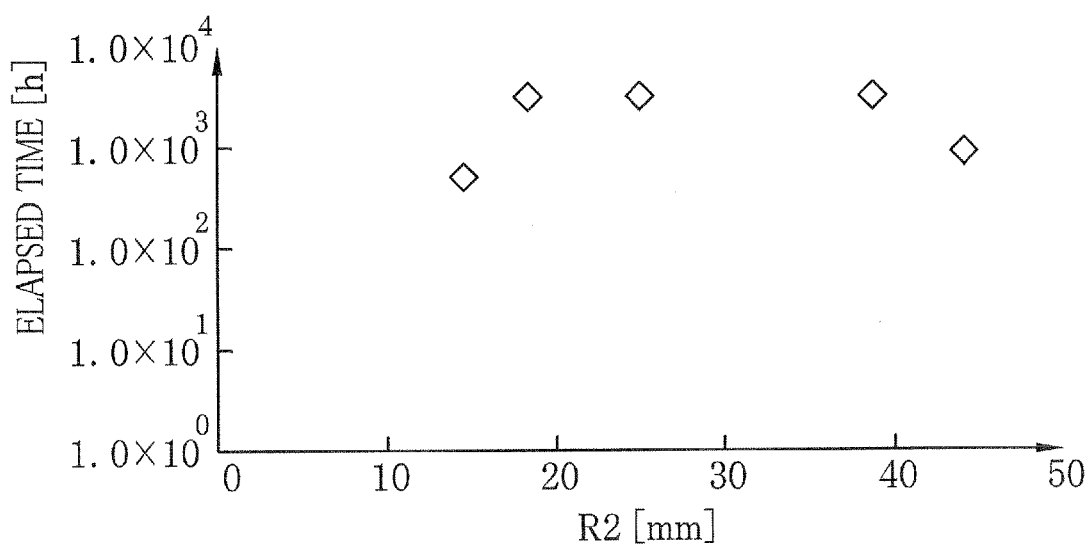
FIG. 5 is a semi-log graph showing a relation between a curvature radius R2 of the end surface of the multi-core ferrule and time the output takes to fall by 10%.

As shown in FIG. 5, the times in the experiments 1 to 3 were 3000 hours or more and they were evaluated as "Very Good". On the contrary, the time in the comparative experiment 1 was 844 hours and it was evaluated as "Very Poor".

The time in the comparative experiment 2 was 489 hours and it was evaluated as "Very Poor".

According to the results of the experiments and the comparative experiments, it is confirmed that the convex end surface 49 of the multi-core ferrule 14 having the curvature radius R2 in the range of 18.3 mm to 38.7 mm (18.3 mm≦R2≦38.7 mm) when the convex end surface 31 of the single-core ferrule 12 has the curvature radius R1 of at least 50 mm (R1≧50 mm) causes the output to take 3000 hours or more to fall by 10%. The connection structure 11 for the optical fibers satisfying the above condition can minimize optical loss.

Figure 6:
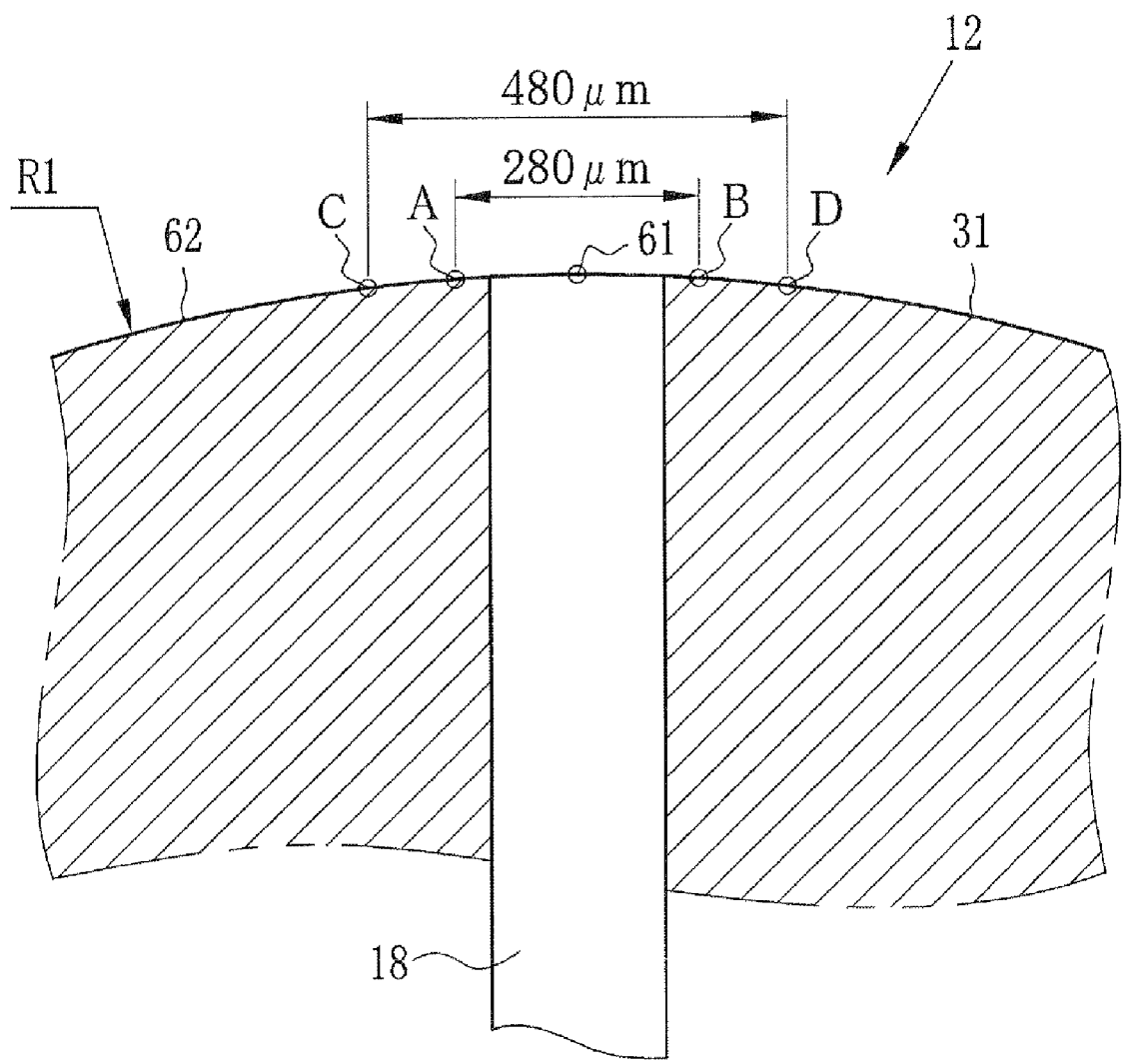
FIG. 6 is a sectional view of the single-core ferrule.

Hereinafter, the method for measuring the curvature radii R1 of Examples 1 and 2 is explained with reference to FIG. 6. A line 62 that passed a center 61 of the end surface 31 of the single-core ferrule 12 was taken. Intersection points of the line 62 and a circle with a diameter of 280 μm around the center 61 were defined as measurement points "A" and "B". Intersection points of the line 62 and a circle with a diameter of 480 μm around the center 61 were defined as measurement points "C" and "D". Any three of these measurement points "A", "B", "C" and "D" were subjected to measure its two-dimensional coordinate value using a measurement instrument. Each of the measured coordinate value was converted into the curvature radius R1 using the law of sines. Note that the curvature radii R2 of the multi-core ferrules 14 were measured according to the same method.

The two-dimensional coordinate values are usually measured with an interferometer. Since the optical fiber bundle 19 formed of four optical fibers 39 tied together was inserted into the multi-core ferrule 14, Moire fringes could be induced. However, a flat area enough for observing the Moire fringes was not ensured, and therefore the interferometer could not be used to measure the two-dimensional coordinate values. In view of this, the two-dimensional coordinate values were measured with a measurement instrument manufactured by Dage Holding Limited. Although the two-dimensional coordinate values of the single-core ferrules 12 could be measured with the interferometer, they were measured with the same measurement instrument as the multi-core ferrules 14.

EXAMPLE 3

Hereinafter, Example 3 of the present invention is explained. A relation between a width of the gap Δ and a shadow was studied.

Experiment 1

The end surface 31 of the single-core ferrule 12 was finished into a convex surface with the curvature radius R1 of 11 mm. The end surface 49 of the multi-core ferrule 14 was finished into a convex surface with the curvature radius R2 of 22 mm.

Experiment 2

The end surface 31 of the single-core ferrule 12 was finished into a convex surface with the curvature radius R1 of 14.3 mm. The end surface 49 of the multi-core ferrule 14 was finished into a convex surface with the curvature radius R2 of 18.3 mm.

Experiment 3

The end surface 31 of the single-core ferrule 12 was finished into a convex surface with the curvature radius R1 of 75 mm. The end surface 49 of the multi-core ferrule 14 was finished into a convex surface with the curvature radius R2 of 19 mm.

Experiment 4

The end surface 31 of the single-core ferrule 12 was finished into a convex surface with the curvature radius R1 of 30 mm. The end surface 49 of the multi-core ferrule 14 was finished into a convex surface with the curvature radius R2 of 24.4 mm.

Experiment 5

The end surface 31 of the single-core ferrule 12 was finished into a convex surface with the curvature radius R1 of 120 mm. The end surface 49 of the multi-core ferrule 14 was finished into a convex surface with the curvature radius R2 of 22.5 mm.

Experiment 6

The end surface 31 of the single-core ferrule 12 was finished into a convex surface with the curvature radius R1 of 90 mm. The end surface 49 of the multi-core ferrule 14 was finished into a convex surface with the curvature radius R2 of 22.5 mm.

Experiment 7

The end surface 31 of the single-core ferrule 12 was finished into a convex surface with the curvature radius R1 of 17 mm. The end surface 49 of the multi-core ferrule 14 was finished into a convex surface with the curvature radius R2 of 22.5 mm.

Figure 7:
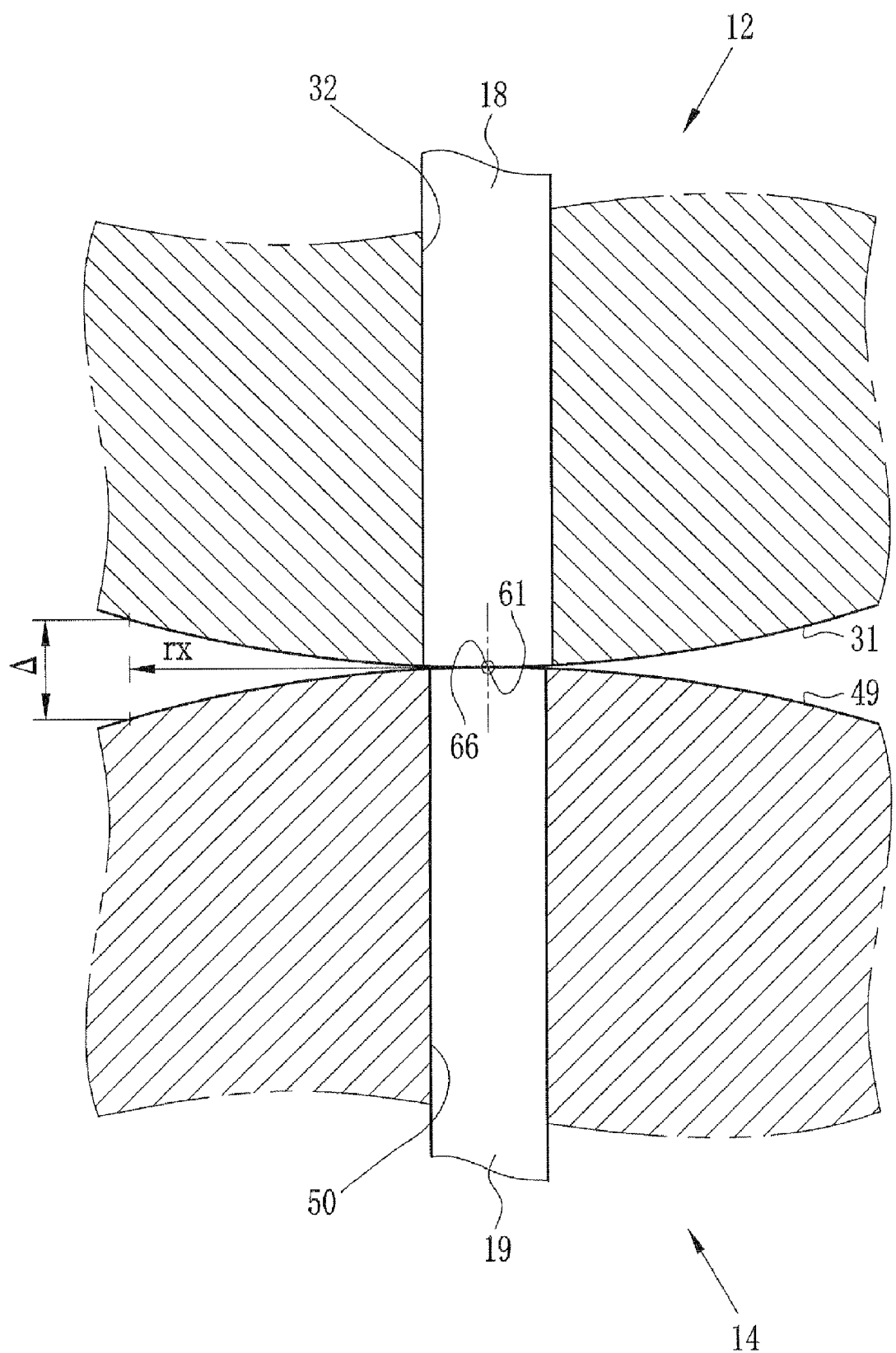
FIG. 7 is an enlarged sectional view illustrating the single-core ferrule which is in contact with the multi-core ferrule.

In each of the experiments and the comparative experiments, a test for conducting light having a wave length of 405 nm and an electric power of 1.4 watts to the connection structure 11 of the optical fibers was performed, and the condition of the multi-core ferrule 14 after 3000 hours was observed. A semiconductor laser was used as a light source. Specifically, whether there was a shadow within an area defined by a circle with a radius of rx (not shown) around a center 66 of the end surface 49 of the multi-core ferrule 14 was observed using a microscope, as shown in FIG. 7. During the observation, the radius rx of the circle was increased by 5 μm. The shadow was induced by the adhesive material filled inside the through hole 50 of the multi-core ferrule 14, dust in the air, and the like. The gap Δ between the end surface 31 of the single-core ferrule 12 and the end surface 49 of the multi-core ferrule 14 at a radius of rx was calculated by a geometric calculation.

Figure 8:
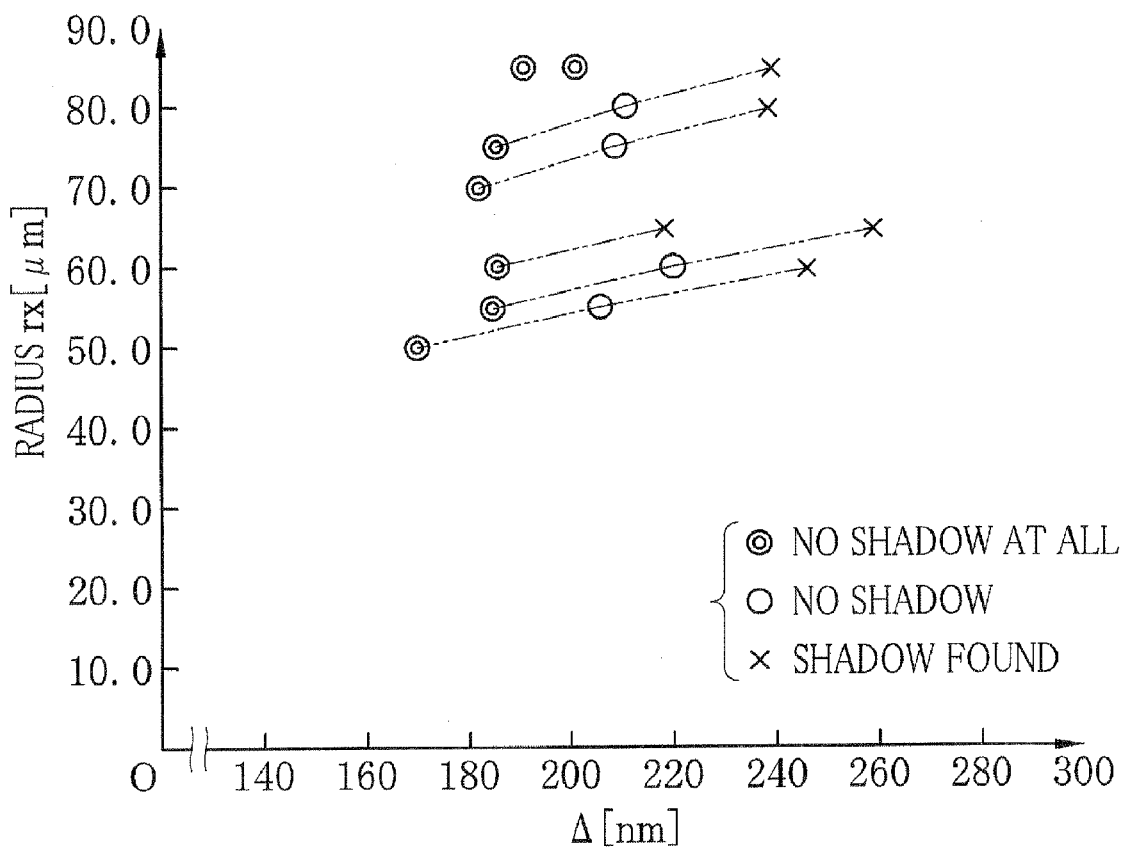
FIG. 8 is a graph showing a relation of a radius rx measured from the center of the through hole and a gap Δ between the singe-core ferrule and the multi-core ferrule.

In experiment 1, there was no shadow at all in an area within a radius rx of 50 μm and it was evaluated as "Very Good" (shown as ⊚ in FIG. 8). There was no shadow in an area within a radius rx of 55 μm and it was evaluated as "Good" (shown as ○ in FIG. 8). Meanwhile, there was a shadow in an area within a radius rx of 60 μm and it was evaluated as "Very Poor" (shown as × in FIG. 8). As shown in FIG. 8, the gap Δ between the end surface 31 of the single-core ferrule 12 and the end surface 49 of the multi-core ferrule 14 at the position where the radius rx was 50 μm, evaluated as "Very Good", was 170 nm. The gap Δ at the position where the radius rx was 55 μm, evaluated as "Good", was 206 nm. The gap Δ at the position where the radius rx was 60 μm, evaluated as "Very Poor", was 245 nm.

In experiment 2, there was no shadow at all in an area within a radius rx of 55 µm and it was evaluated as "Very Good". There was no shadow in an area within a radius rx of 60 µm and it was evaluated as "Good". Meanwhile, there was a shadow in an area within a radius rx of 65 µm and it was evaluated as "Very Poor". As shown in FIG. 8, the gap Δ between the end surface 31 of the single-core ferrule 12 and the end surface 49 of the multi-core ferrule 14 at the position where the radius rx was 55 µm, evaluated as "Very Good", was 185 nm. The gap Δ at the position where the radius rx was 60 µm, evaluated as "Good", was 220 nm. The gap Δ at the position where the radius rx was 65 µm, evaluated as "Very Poor", was 258 nm.

In experiment 3, there was no shadow at all in an area within a radius rx of 75 µm and it was evaluated as "Very Good". There was no shadow in an area within a radius rx of 80 µm and it was evaluated as "Good". Meanwhile, there was a shadow in an area within a radius rx of 85 µm and it was evaluated as "Very Poor". As shown in FIG. 8, the gap Δ between the end surface 31 of the single-core ferrule 12 and the end surface 49 of the multi-core ferrule 14 at the position where the radius rx was 75 µm, evaluated as "Very Good", was 186 nm. The gap Δ at the position where the radius rx was 80 µm, evaluated as "Good", was 211 nm. The gap Δ at the position where the radius rx was 85 µm, evaluated as "Very Poor", was 238 nm.

In experiment 4, there was no shadow at all in an area within a radius rx of 70 µm and it was evaluated as "Very Good". There was no shadow in an area within a radius rx of 75 µm and it was evaluated as "Good". Meanwhile, there was a shadow in an area within a radius rx of 80 µm and it was evaluated as "Very Poor". As shown in FIG. 8, the gap Δ between the end surface 31 of the single-core ferrule 12 and the end surface 49 of the multi-core ferrule 14 at the position where the radius rx was 70 µm, evaluated as "Very Good", was 182 nm. The gap Δ at the position where the radius rx was 75 µm, evaluated as "Good", was 209 nm. The gap Δ at the position where the radius rx was 80 µm, evaluated as "Very Poor", was 238 nm.

In experiment 5, there was no shadow at all in an area within a radius rx of 85 µm and it was evaluated as "Very Good". Note that there was also no shadow in an area with radii rx of over 85 µm. As shown in FIG. 8, the gap Δ between the end surface 31 of the single-core ferrule 12 and the end surface 49 of the multi-core ferrule 14 at the position where the radius rx was 85 µm, evaluated as "Very Good", was 191 nm.

In experiment 6, there was no shadow at all in an area within a radius rx of 85 µm and it was evaluated as "Very Good". Note that there was also no shadow in an area with radii rx of over 85 µm. As shown in FIG. 8, the gap Δ between the end surface 31 of the single-core ferrule 12 and the end surface 49 of the multi-core ferrule 14 at the position where the radius rx was 85 µm, evaluated as "Very Good", was 201 nm.

In experiment 7, there was no shadow at all in an area within a radius rx of 60 µm and it was evaluated as "Very Good". Meanwhile, there was shadow in an area within a radius rx of 65 µm and it was evaluated as "Very Poor". As shown in FIG. 8, the gap Δ between the end surface 31 of the single-core ferrule 12 and the end surface 49 of the multi-core ferrule 14 at the position where the radius rx was 60 µm, evaluated as "Very Good", was 186 nm. The gap Δ at the position where the radius rx was 65 µm, evaluated as "Very Poor", was 218 nm.

According to the results of the experiments, it is understood that a shadow is not induced when the gap Δ between the end surface 31 of the single-core ferrule 12 and the end surface 49 of the multi-core ferrule 14 is 200 nm or less. The connection structure 11 for the optical fibers satisfying this condition can minimize optical loss.

Various changes and modifications are possible in the present invention and may be understood to be within the present invention.

What is claimed is:

1. A multi-core ferrule for holding an optical fiber bundle, said optical fiber bundle being optically connected to a single optical fiber held in a single-core ferrule, said single-core ferrule having a convex first end surface whose curvature radius is at least 50 mm and a circular first through hole penetrating the center of said first end surface, said optical fiber being inserted into said first through hole such that an end surface of said optical fiber coincides with said first end surface, said multi-core ferrule comprising:
    a second end surface being in abutting contact with said first end surface and having a convex surface whose curvature radius is in the range of 18.3 mm to 38.7 mm; and
    a circular second through hole penetrating the center of said second end surface, said optical fiber bundle being inserted into said second through hole such that an end surface of said optical fiber bundle coincides with said second end surface, said second through hole having a smaller diameter than said first through hole and aligning with said first through hole.

2. The multi-core ferrule of claim 1, wherein said first through hole has an inner diameter of 255 µm and said second through hole has an inner diameter of 200 µm.

3. The multi-core ferrule of claim 1, wherein said optical fiber bundle is fixed inside said second through hole using an adhesive material.

4. The multi-core ferrule of claim 1, wherein said optical fiber bundle has four optical fibers.

5. The multi-core ferrule of claim 4, wherein
    said optical fiber held in said single-core ferrule includes a core having a diameter of 205 µm and a clad surrounding said core and having an outer diameter of 250 µm; and
    each of said optical fibers forming said optical fiber bundle includes a core having a diameter of 60 µm and a clad surrounding said core and having an outer diameter of 80 µm.

6. A connection structure for optically connecting a single optical fiber and an optical fiber bundle, comprising:
    a single-core ferrule for holding said optical fiber, said single-core ferrule having a convex first end surface whose curvature radius is at least 50 mm and a circular first through hole penetrating the center of said first end surface, said optical fiber being inserted into said first through hole such that an end surface thereof coincides with said first end surface; and
    a multi-core ferrule for holding said optical fiber bundle, said multi-core ferrule having a convex second end surface whose curvature radius is in the range of 18.3 mm to 38.7 mm and a circular second through hole penetrating the center of said second end surface, said optical fiber bundle being inserted into said second through hole such that an end surface thereof coincides with said second end surface, said second through hole having a smaller diameter than said first through hole, said second end surface being in abutting contact with said first end surface with said second through hole aligned with said first through hole.

7. The connection structure of claim 6, further comprising:
    a first holder for holding said single-core ferrule;

a second holder for holding said multi-core ferrule; and
first and second press members for pressing said first and second holders respectively so as to bring said first end surface into contact with said second end surface.

8. The connection structure of claim 7, further comprising:
a first plug for holding said single-core ferrule, said first holder and said first press member;
a second plug for holding said multi-core ferrule, said second holder and said second press member; and
an adaptor for joining said first plug and said second plug.

9. The multi-core ferrule of claim 1, wherein said optical fiber bundle and said single optical fiber are in a physical contact connection.

10. The connection structure of claim 6, wherein said optical fiber bundle and said single optical fiber are in a physical contact connection.

* * * * *